(12) United States Patent
Zimmerman et al.

(10) Patent No.: US 11,754,109 B2
(45) Date of Patent: *Sep. 12, 2023

(54) POLYMERIC FASTENER

(71) Applicant: SR Systems, LLC, Tuscaloosa, AL (US)

(72) Inventors: Steve Zimmerman, Linden, AL (US); Scott Drummond, Tuscaloosa, AL (US); Van T. Walworth, Rockwood, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/182,843

(22) Filed: Feb. 23, 2021

(65) Prior Publication Data

US 2021/0180631 A1    Jun. 17, 2021

Related U.S. Application Data

(63) Continuation of application No. 16/037,753, filed on Jul. 17, 2018, now Pat. No. 10,962,039.

(60) Provisional application No. 62/533,280, filed on Jul. 17, 2017.

(51) Int. Cl.
*F16B 15/00*        (2006.01)
*B29L 31/00*        (2006.01)

(52) U.S. Cl.
CPC .......... *F16B 15/00* (2013.01); *F16B 15/0015* (2013.01); *B29L 2031/7286* (2013.01)

(58) Field of Classification Search
CPC .................. F16B 15/00; F16B 15/0015; B29L 2031/7286

USPC .......................................... 411/411, 424, 487
See application file for complete search history.

(56) References Cited

U.S. PATENT DOCUMENTS

| | | | | |
|---|---|---|---|---|
| 1,829,974 A | * | 11/1931 | Williams | F16B 15/0092 |
| | | | | 428/681 |
| 2,073,037 A | * | 3/1937 | Weber | A47C 31/026 |
| | | | | 24/265 C |
| 2,718,647 A | * | 9/1955 | Raible | B21G 3/28 |
| | | | | 411/902 |
| 2,868,057 A | * | 1/1959 | Anstett | B21G 3/26 |
| | | | | 411/451.3 |
| 3,384,141 A | * | 5/1968 | Kost | F16B 33/006 |
| | | | | 411/908 |
| 4,718,801 A | * | 1/1988 | Berecz | F16B 33/006 |
| | | | | 411/908 |

(Continued)

OTHER PUBLICATIONS

"U.S. Appl. No. 16/037,753, Non Final Office Action dated Aug. 10, 2020", 13 pgs.

(Continued)

*Primary Examiner* — Roberta S Delisle
(74) *Attorney, Agent, or Firm* — Schwegman, Lundberg & Woessner, P.A.

(57) ABSTRACT

A polymeric fastener for use in the construction industry for fastening wood and other basic materials together. The polymeric fastener can be formed in the basic shape of a nail and/or a staple-like fastener. Preferred embodiments of the polymeric fastener include a hardened binder embedded with a filler and/or a core for adequate strength as required for use with a delivery device powered by pneumatics, hydraulics, or other mechanical systems.

20 Claims, 2 Drawing Sheets

(56) References Cited

U.S. PATENT DOCUMENTS

| | | | | |
|---|---|---|---|---|
| 4,863,330 | A * | 9/1989 | Olez | B29C 70/14 |
| | | | | 411/908 |
| 5,557,898 | A * | 9/1996 | Dixon | F16B 15/06 |
| | | | | 411/456 |
| 6,758,018 | B2 * | 7/2004 | Sutt, Jr. | F16B 15/08 |
| | | | | 411/455 |
| 8,465,241 | B2 * | 6/2013 | Gaw | B29C 70/70 |
| | | | | 411/908 |
| 10,690,166 | B2 * | 6/2020 | Horst | F16B 33/008 |
| 10,962,039 | B2 | 3/2021 | Zimmerman et al. | |
| 2014/0271035 | A1 * | 9/2014 | Wang | F16B 33/006 |
| | | | | 411/424 |
| 2019/0017530 | A1 | 1/2019 | Zimmerman et al. | |

OTHER PUBLICATIONS

"U.S. Appl. No. 16/037,753, Notice of Allowance dated Nov. 27, 2020", 9 pgs.

"U.S. Appl. No. 16/037,753, Response filed Jul. 22, 2020 to Restriction Requirement dated May 26, 2020", 7 pgs.

"U.S. Appl. No. 16/037,753, Response filed Nov. 5, 2020 to Non Final Office Action dated Aug. 10, 2020", 12 pgs.

"U.S. Appl. No. 16/037,753, Restriction Requirement dated May 26, 2020", 7 pgs.

* cited by examiner

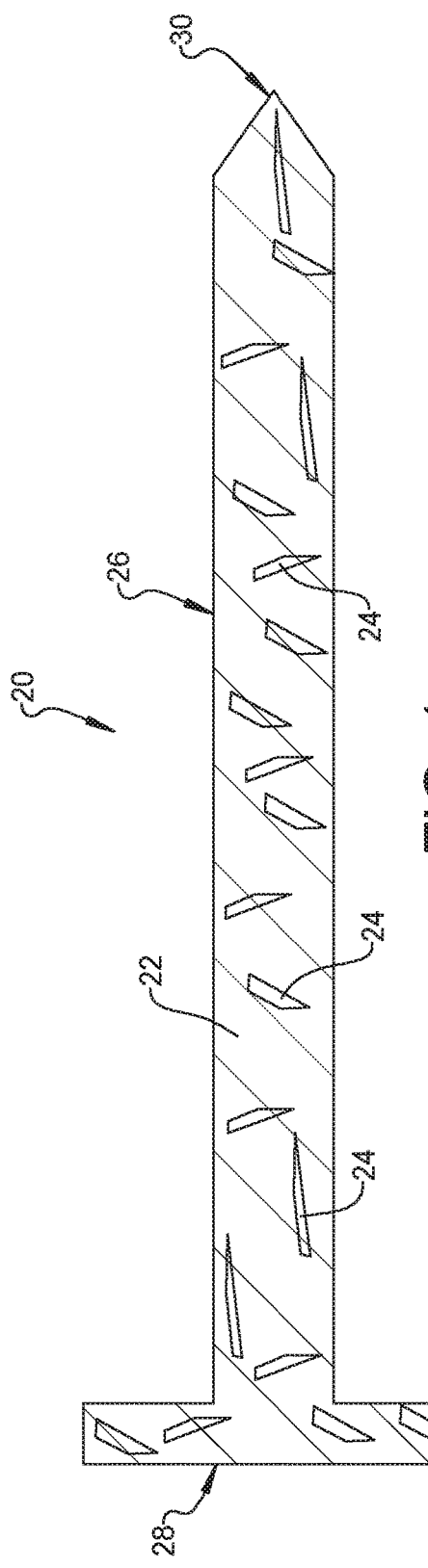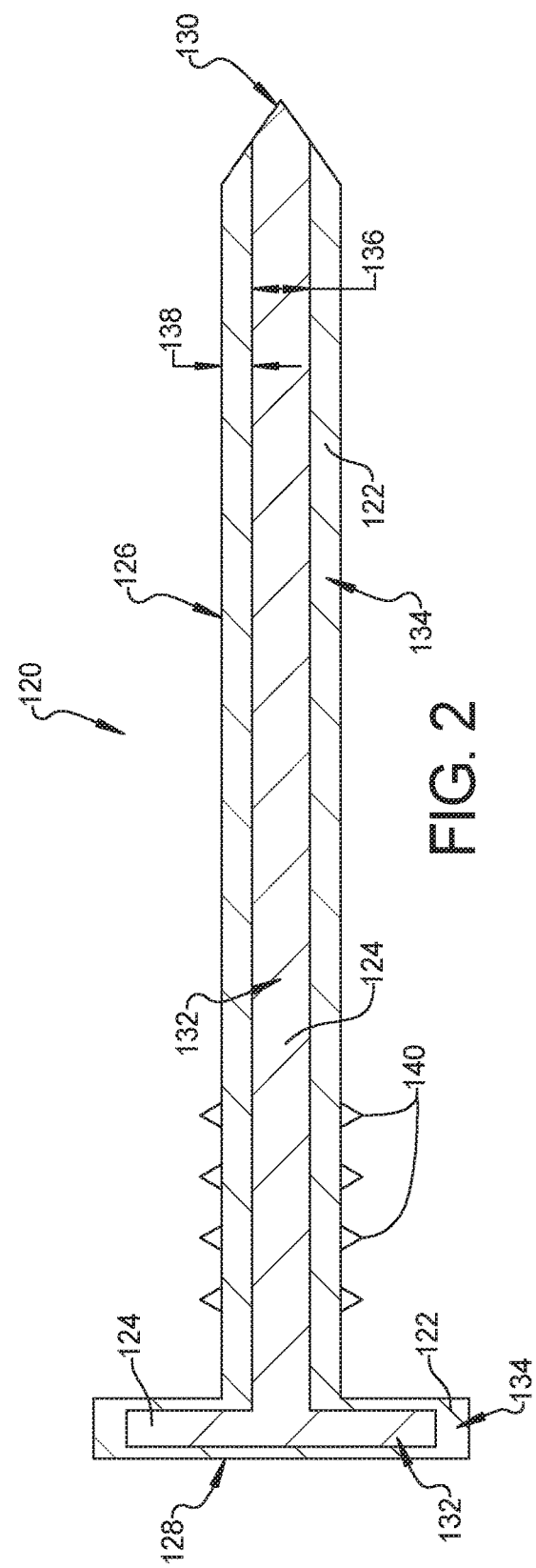

POLYMERIC FASTENER

CROSS-REFERENCE TO RELATED APPLICATIONS

This application is a Continuation of U.S. patent application Ser. No. 16/037,753 filed on Jul. 17, 2018, which claims the benefit of U.S. Provisional Patent Application No. 62/533,280 filed on Jul. 17, 2017. The entire disclosures of the above referenced applications are incorporated herein by reference.

FIELD

The subject disclosure generally relates to fasteners such as those used in the construction industry and more particularly to fasteners such as nails and staples.

BACKGROUND

This section provides background information related to the present disclosure which is not necessarily prior art.

Fasteners are commonly used in the construction industry to fasten buildings together. Examples of fasteners include nails and staples. Such fasteners are typically made of a single material such as steel or some other type of metal. However, there are some low force requirement fasteners where the single material forming the fastener is a non-ferrous material, such as plastic. Known fasteners made of a non-ferrous material are not suitable for the construction industry because they typically do not have sufficient strength to hold building components together.

SUMMARY

This section provides a general summary of the disclosure, and is not a comprehensive disclosure of its full scope or all of its features.

The present disclosure is directed to improved polymeric fasteners. In accordance with one aspect of the present disclosure, a fastener is provided with an internal strengthening core having a first thickness and an outer layer disposed about the internal strengthening core. The outer layer has a second thickness that is at least half as thick as the first thickness of the internal strengthening core. The outer layer is made of a first material that is a polymeric material and the internal strengthening core is made of a second material that is different than the first material of the outer layer.

In accordance with another aspect of the present disclosure, a nail-like fastener is provided, which includes a shank, a head at one end of the shank, and a point at an opposite end of the shank. The shank and the head are made of a first material and a second material. The first material comprises at least 50 percent of the material in the shank and the head of the nail-like fastener. The first material is a polymeric material and the second material is different than the first material and is stronger than the first material.

In accordance with another aspect of the present disclosure, a staple-like fastener is provided, which includes a bridge portion that extends between first and second ends, a first leg that extends from the first end of the bridge portion, and a second leg that extends from the second end of the bridge portion. The first and second legs are parallel to one another and are transverse to the bridge portion. The bridge portion and the first and second legs are made of a first material and a second material. The first material comprises at least 50 percent of the material in the bridge portion and the first and second legs of the staple-like fastener. The first material is a polymeric material and the second material is different than the first material and is stronger than the first material.

BRIEF DESCRIPTION OF DRAWINGS

The drawings described herein are for illustrative purposes only of selected embodiments and not all possible implementations, and are not intended to limit the scope of the present disclosure.

Other advantages of the present invention will be readily appreciated, as the same becomes better understood by reference to the following detailed description when considered in connection with the accompanying drawings wherein:

FIG. 1 is a side cross-sectional view of an exemplary polymeric fastener constructed in accordance with the subject disclosure where the polymeric fastener is a nail formed of a reinforced polymeric material;

FIG. 2 is a side cross-sectional view of another exemplary polymeric fastener constructed in accordance with the subject disclosure where the polymeric fastener is a nail formed of an outer layer of polymeric material and an internal strengthening core that is made of a different material;

DETAILED DESCRIPTION

Figure 3:
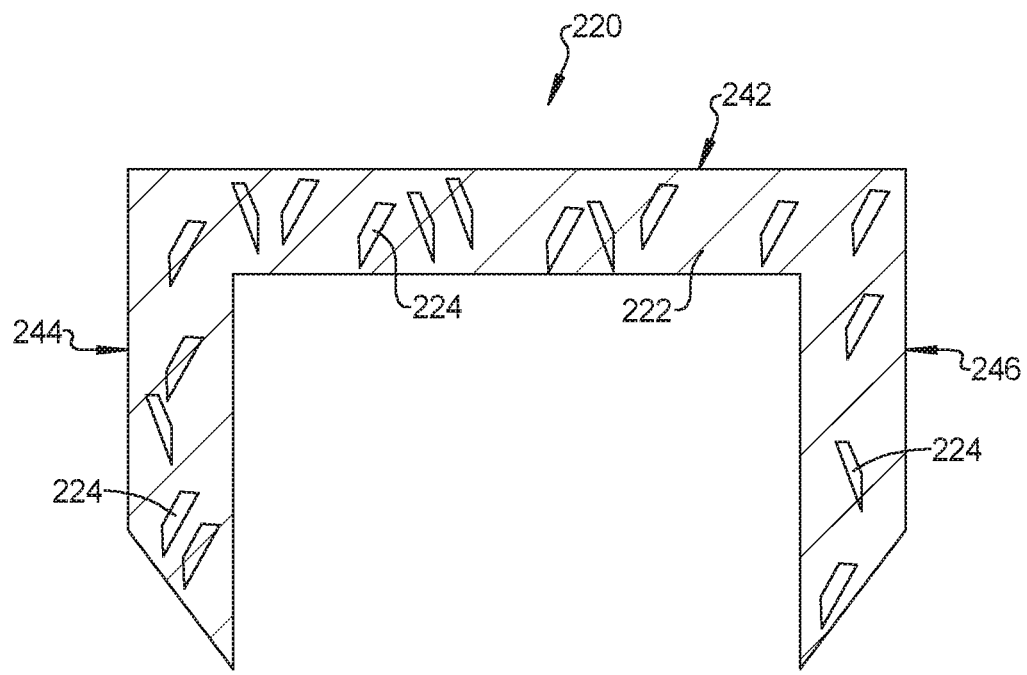
FIG. 3 is a side cross-sectional view of an exemplary polymeric fastener constructed in accordance with the subject disclosure where the polymeric fastener is a staple formed of a reinforced polymeric material.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The subject disclosure provides for composite fasteners 20, 120, 220, 320 that are made of at least two different materials. At least one of the two materials is a polymeric material. The other material can be a different polymeric material, or alternatively, a material that is not a polymer. In the embodiments shown in FIGS. 1 and 2, the shape of the fasteners 20, 120 is that of a typical construction framing nail for wood construction buildings. In the embodiments shown in FIGS. 3 and 4, the shape of the fastener 220, 320 is that of a typical staple-like fastener, such as may be used in the fastening of roofing felt, roof shingles, house wrap, and other similar substrate products.

Referring to FIG. 1, a first exemplary fastener 20 is illustrated, which has a nail-like arrangement. The fastener 20 includes a shank 26, a head 28 at one end of the shank 26, and a point 30 at an opposite end of the shank 26. The fastener 20 includes a first material 22 that is a polymeric material, such as a resin based polymeric composition like high density polyethylene (HDPE), ultra high molecular weight polyethylene (UHMWPE), or other similar polymeric materials. The first material 22 is infused with a second material 24 that acts as a strengthening substance. To accomplish this function, the second material 24 is stronger than the first material 22. For example, high density polyethylene (HDPE) can have strength issues, which can be enhanced by adding various types of fibers, glass filling, metal filings, nano-spheres, and/or other material ingredients.

In the example shown in FIG. 1, the second material 24 is scattered throughout the first material 22, which acts as a base material. In other words, the first material 22 forms at least 50 percent of the material volume in the shank 26 and head 28 of the fastener 20. The second material 24 may be any one of several nano-spheroid materials such as glass, ceramics, metals, plastics, polycarbonates, or a combination thereof. The second material 24 may be a fibrous material such as fabrics, polyesters, Kevlar, etc. Fibrous materials may also be in the form of relatively straight fiber stands of various lengths and/or fibers with wiry interlocking entanglement characteristics.

A preferred optimum ratio of the first material 22 to the second material 24 has been found to be from 1:0.059 to 1:0.154 (expressed as volume of first material 22: volume of second material 24). Stated another way, the second material 24 comprises at that least 4.5 percent of the volume of the total composite (i.e., the total volume of the fastener 20) and optimally the second material 24 comprises from 5.9 percent to 15.4 percent of the volume of total composite (i.e., the total volume of the fastener 20).

In one alternative embodiment, the second material 24 may be comprised of at least two ingredients which have a specific ratio between them to provide strengthening capabilities and other properties that the first material 22 does not possess. For instance, high density polyethylene (HDPE) is not naturally ozone resistant and will degrade over time when exposed to sunlight. Adding a second ingredient such as carbon will provide ozone resistance. In accordance with this embodiment, the second material 24 is comprised of at least two ingredients which are combined into the composite at a pre-defined ratio to each other. A preferred optimum ratio of the ozone resistant ingredient(s) to the strengthening ingredient(s) has been found to be from 45:55 to 40:60 (expressed as volume of the ozone resistant ingredient(s): volume of the strengthening ingredient(s)).

Adding ingredients into the first material 22 must be considered carefully because the balance of ingredients in the second material 24 can create a composite that has compromised properties compared to the first material 22. Testing has shown that benefits in ozone resistance and improved strength can be accomplished with high density polyethylene (HDPE) as the first material 22, while a combination of carbon dust for ozone resistance and fibers for strengthening greatly improve the capabilities and performance of the polymeric fasteners 20, 120, 220, 320. It should be appreciated that the ratios listed above are not limited to the exemplary fastener 20 shown in FIG. 1 and apply equally to the fasteners 120, 220, 320 shown in FIGS. 2-4.

Referring to FIG. 2, a second exemplary fastener 120 is illustrated, which again has a nail-like arrangement. The fastener 120 includes a shank 126, a head 128 at one end of the shank 126, and a point 130 at an opposite end of the shank 126. The head 128 and shank 126 of the fastener 120 have an internal strengthening core 132 and an outer layer 134 that is disposed about the internal strengthening core 132. The outer layer 134 is made of a first material 122. The first material 122 forming the outer layer 134 is a polymeric material, such as a resin based polymeric composition like high density polyethylene (HDPE), ultra high molecular weight polyethylene (UHMWPE), or other similar polymeric materials. The internal strengthening core 132 is made of a second material 124 that is stronger than the first material 122 forming the outer layer 134. The second material 124 forming the internal strengthening core 132 is a carbon fiber material, a metal wire-like material insert, a hardened resin material, a sintered metal, or other reinforced core material. The internal strengthening core 132 has a first thickness 136 and the outer layer 134 has a second thickness 138 that is at least half as thick as the first thickness 136 of the internal strengthening core 132. As a result, it should be appreciated that the first material 122 forms at least 50 percent of the material volume in the shank 126 and head 128 of the fastener 120, which distinguishes the outer layer 134 from a thin coating applied to a conventional nail. In the embodiment illustrated in FIG. 2, the fastener 120 also has retention features 140 that extend outwardly from the shank 126. The retention features 140 in the illustrated example are made of the first material 122.

The fasteners 20, 120 illustrated in FIGS. 1 and 2 can be made available in many shank diameters and lengths depending upon the construction requirements. The fasteners 20, 120 disclosed in FIGS. 1 and 2 may also be provided with a different head design (not shown) to enhance the function of the polymeric fasteners 20, 120 compared to a traditional nail formed from a wire drawn system. The head 28, 128 of polymeric fasteners 20, 120 is not limited to certain shape, size, and/or design details, which limit such characteristics of wire drawn fasteners due to the manufacturing operations used to form wire drawn fasteners.

Polymeric fasteners 20, 120 also have an advantage over traditional wire drawn fasteners in that the typical limitations on the design of retention features 140 are not present because of the formation methods available to polymeric fasteners 20, 120. For example, enhanced ring shanks 140 of a myriad of design shapes can be formed on the shank 26 of polymeric fasteners 20, 120. These retention features 140 would be otherwise impossible to form on a traditional wire drawn fastener shank due to the manufacturing operations used to from such wire drawn fasteners.

Referring to FIG. 3, a third exemplary fastener 220 is illustrated, which has a staple-like arrangement. The fastener 220 includes a bridge portion 242, a first leg 244 that extends from a first end of the bridge portion 242, and a second leg 246 that extends from a second end of the bridge portion 242 that is opposite the first end of the bridge portion 242. The first and second legs 244, 246 are substantially parallel to one another and are substantially transverse to the bridge portion 242. The fastener 220 includes a first material 222 that is a polymeric material, such as a resin based polymeric composition like high density polyethylene (HDPE), ultra high molecular weight polyethylene (UHMWPE), or other similar polymeric materials. The first material 222 is infused with a second material 224 that acts as a strengthening substance. To accomplish this function, the second material 224 is stronger than the first material 222.

In the example shown in FIG. 3, the second material 224 is scattered throughout the first material 222, which acts as a base material. In other words, the first material 222 forms at least 50 percent of the material volume in the bridge portion 242 and the first and second legs 244, 246 of the fastener 220. The second material 224 may be any one of several nano-spheroid materials such as glass, ceramics, metals, plastics, polycarbonates, or a combination thereof. The second material 224 may be a fibrous material such as fabrics, polyesters, Kevlar, etc. Fibrous materials may also be in the form of relatively straight fiber stands of various lengths and/or fibers with wiry interlocking entanglement characteristics.

Figure 4:
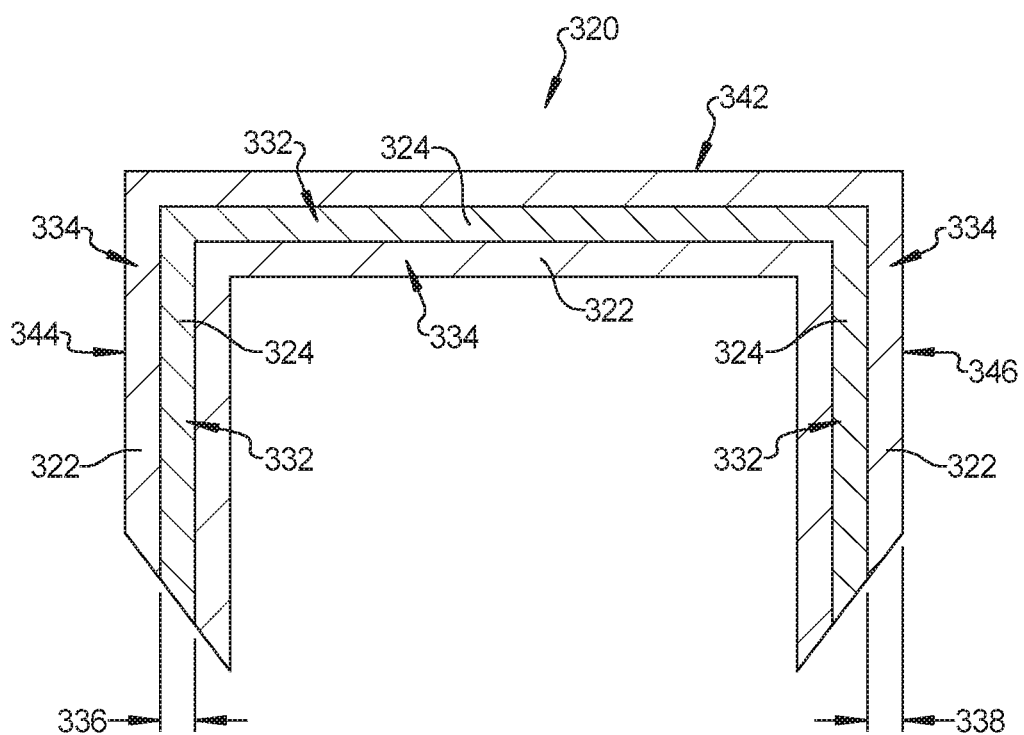
FIG. 4 is a side cross-sectional view of another exemplary polymeric fastener constructed in accordance with the subject disclosure where the polymeric fastener is a staple formed of an outer layer of polymeric material and an internal strengthening core that is made of a different material.

Referring to FIG. 4, a fourth exemplary fastener 320 is illustrated, which again has staple-like arrangement. The fastener 320 includes a bridge portion 342, a first leg 344 that extends from a first end of the bridge portion 342, and a second leg 346 that extends from a second end of the bridge portion 342 that is opposite the first end of the bridge portion 342. The first and second legs 344, 346 are substantially parallel to one another and are substantially transverse to the bridge portion 342. The bridge portion 342 and the first and second legs 344, 346 of the fastener 320 have an internal strengthening core 332 and an outer layer 334 that is disposed about the internal strengthening core 332. The outer layer 334 is made of a first material 322. The first material 322 forming the outer layer 334 is a polymeric material, such as a resin based polymeric composition like high density polyethylene (HDPE), ultra high molecular weight polyethylene (UHMWPE), or other similar polymeric materials. The internal strengthening core 332 is made of a second material 324 that is stronger than the first material 322 forming the outer layer 334. The second material 324 forming the internal strengthening core 332 is a carbon fiber material, a metal wire-like material insert, a hardened resin material, a sintered metal, or other reinforced core material. The internal strengthening core 332 has a first thickness 336 and the outer layer 334 has a second thickness 338 that is at least half as thick as the first thickness 336 of the internal strengthening core 332. As a result, it should be appreciated that the first material 322 forms at least 50 percent of the material volume in the bridge portion 342 and the first and second legs 344, 346 of the fastener 320, which distinguishes the outer layer 334 from a thin coating applied to a conventional staple.

Those skilled in the art will appreciate the challenges fasteners present, in that extensive manufacturing development time and effort is required in order to achieve acceptable performance characteristics for use in the construction industry. Manufacturing methods for the polymeric fasteners 20, 120, 220, 320 described above will vary from one another depending upon which outer layer material is used and which strengthening materials are used in the fabrication of the fasteners 20, 120, 220, 320.

Outer layer materials (i.e., the first material 22, 122, 222, 322) such as polymers, high density polyethylene (HDPE), and other similar materials and/or resin based materials may be injected, compression formed, cast, or epoxy mixed and poured into a representative formed fastener shaped mold cavity. The outer layer material may be formed over an inner insert strengthening material (i.e., the second material 24, 124, 224, 324) and/or the outer layer material may be infused (i.e., impregnated) with the strengthening material so as to evenly distribute the strengthening material throughout the outer layer material.

After initial forming of the polymeric fasteners 20, 120, 220, 320, any one of several various secondary operations may be required depending upon the first material 22, 122, 222, 322 used as the outer layer material. A casting method may include a parting line trimming operation. In addition, a post forming hardening operation may be performed. One or more catalysts may be used to cure the outer layer material and/or the strengthening material. An oven post curing operation and/or an ultraviolet light curing operation may be utilized to develop appropriate structural and/or mechanical properties of the fasteners 20, 120, 220, 320. A pointing operation may be required to apply the preferred shape to one end of the fasteners 20, 120, 220, 320 for desired penetration characteristics depending on the type of substrates being fastened.

Polymeric fasteners 20, 120, 220, 320 offer additional benefits in that they can be made of rust and corrosion resistant materials. In sand and beach construction applications, polymeric fasteners can provide salt-water corrosion resistance. Other corrosive environments can be serviced as well with specially composed polymeric fasteners. In addition to salt-water environments, other contaminates can be resisted with appropriately composed polymeric material fasteners.

Still other polymeric fasteners can be formed to be electrically non-conductive to prevent tracking and/or sparking in high voltage construction applications. In contrast, a preferred amount of electrically conductive material such as graphite or graphene can be infused into the outer layer material so that a specific electrical conductivity can be establish for specified grounding and/or anti-static construction fastener applications.

In most applications, it will be desirable for users to install the polymeric fasteners 20, 120, 220, 320 via delivery systems powered by pneumatics, hydraulics, or other mechanical systems. Specially designed and/or modified delivery systems can be used depending on the geometry and strength of the polymeric fasteners 20, 120, 220, 320.

An additional benefit of polymeric fasteners 20, 120, 220, 320 is related to the actual weight of the fasteners 20, 120, 220, 320 compared to typical wire drawn fasteners. The polymeric fasteners 20, 120, 220, 320 disclosed herein can be made to be much lighter compared to typical steel fasteners. The polymeric fasteners 20, 120, 220, 320 disclosed herein can be made to have a specific gravity in the range of 0.95-2.0, while steel wire drawn fasteners have a specific gravity in the range of 7.0-8.0, which a factor of at least 600 percent to 700 percent heavier than the polymeric fasteners 20, 120, 220, 320 of the present disclosure. As a result, the shipping cost of raw materials for the polymeric fasteners 20, 120, 220, 320 is dramatically reduced as is the shipping cost of the finished polymeric fasteners 20, 120, 220, 320.

This difference in weight for finished polymeric fasteners 20, 120, 220, 320 provides the added benefit of being able to pack a shipping container with close to 100 percent of its volume being occupied by the polymeric fasteners 20, 120, 220, 320, instead of being limited by weight before filling out the volume. The net result is more finished polymeric fasteners 20, 120, 220, 320 can be shipped by volume at a reduced shipping weight, which saves shipping cost and increases the amount of fasteners 20, 120, 220, 320 that can be shipped at one time.

Those skilled in the art will readily appreciate that there are many more applications for the polymeric fasteners 20, 120, 220, 320 disclosed herein than described in this disclosure. Furthermore, those skilled in the art will also readily appreciate that there are many more materials suitable for use in the formation and fabrication of the polymeric fasteners 20, 120, 220, 320 described herein than have been listed in this disclosure.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A fastener comprising:
an internal strengthening core having a first thickness, the internal strengthening core comprising a first material;
an outer layer disposed about the internal strengthening core, the outer layer having a second thickness that is at least half as thick as the first thickness of the internal strengthening core, and the outer layer comprising a second material that is a polymeric material;
wherein the first material and the second material have different compositions.

2. The fastener of claim 1, wherein the fastener is a nail comprising a shank, a head at one end of the shank, and a point at an opposite end of the shank.

3. The fastener of claim 2, wherein the shank and the head comprise the first and second materials.

4. The fastener of claim 2, wherein the internal strengthening core and the outer layer are present in the shank and the head of the fastener.

5. The fastener of claim 1, wherein the fastener is a staple comprising a bridge portion, a first leg extending from a first end of the bridge portion, and a second leg extending from a second end of the bridge portion that is opposite the first end of the bridge portion.

6. The fastener of claim 5, wherein the bridge portion and the first and second legs comprise the first and second materials.

7. The fastener of claim 5, wherein the internal strengthening core and the outer layer are present in the bridge portion and the first and second legs of the fastener.

8. The fastener of claim 1, wherein the second material comprises at least one of high density polyethylene (HDPE) and ultra high molecular weight polyethylene (UHMWPE).

9. The fastener of claim 8, wherein the first material comprises at least one of carbon fiber, metal fibers, a hardened resin, and sintered metal.

10. The fastener of claim 8, wherein the bridge portion and the first and second legs comprise an internal strengthening core comprising the first material and an outer layer comprising the second material that is disposed about the internal strengthening core.

11. The fastener of claim 1, wherein the first material is stronger than the second material.

12. The fastener of claim 11, wherein the first and second materials are polyethylene materials having different compositions.

13. The fastener of claim 1, wherein e first material is a polymeric material that is stronger than the second material.

14. The fastener of claim 1, wherein the first material comprises glass, ceramic, metal, plastic, polycarbonate, fabric, polyester, Kevlar, or a combination thereof.

15. The fastener of claim 1, wherein the second material forms a base material and the first material is distributed throughout the second material to reinforce the second material.

16. The fastener of claim 1, wherein the second material contains a polyethylene.

17. The fastener of claim 1, wherein the first material comprises at least 4.5 percent of the shank and the head by volume.

18. The fastener of claim 17, wherein the first material comprises 5.9 percent to 15.4 percent of the shank and the head by volume.

19. The fastener of claim 1, wherein the first material comprises a mixture of at least one ozone resistant ingredient and at least one strengthening ingredient at a ratio of 45:55 to 40:60 by volume.

20. A method of using the fastener of claim 1, the method comprising delivering the fastener to a substrate using a delivery system powered by pneumatics or hydraulics.

\* \* \* \* \*

UNITED STATES PATENT AND TRADEMARK OFFICE
CERTIFICATE OF CORRECTION

PATENT NO. : 11,754,109 B2
APPLICATION NO. : 17/182843
DATED : September 12, 2023
INVENTOR(S) : Zimmerman et al.

It is certified that error appears in the above-identified patent and that said Letters Patent is hereby corrected as shown below:

In the Claims

In Column 8, Line 47, in Claim 13, delete "e" and insert --the-- therefor

Signed and Sealed this
Twenty-first Day of November, 2023

Katherine Kelly Vidal
*Director of the United States Patent and Trademark Office*